US 7,640,364 B2

(12) United States Patent
Craft et al.

(10) Patent No.: US 7,640,364 B2
(45) Date of Patent: *Dec. 29, 2009

(54) PORT AGGREGATION FOR NETWORK CONNECTIONS THAT ARE OFFLOADED TO NETWORK INTERFACE DEVICES

(75) Inventors: Peter K. Craft, San Francisco, CA (US); Clive M. Philbrick, San Jose, CA (US); Laurence B. Boucher, Saratoga, CA (US); Daryl D. Starr, Milpitas, CA (US); Stephen E. J. Blightman, San Jose, CA (US); David A. Higgen, Saratoga, CA (US)

(73) Assignee: Alacritech, Inc., San Jose, CA (US)

( * ) Notice: Subject to any disclaimer, the term of this patent is extended or adjusted under 35 U.S.C. 154(b) by 813 days.

This patent is subject to a terminal disclaimer.

(21) Appl. No.: 11/215,464

(22) Filed: Aug. 30, 2005

(65) Prior Publication Data
US 2006/0010238 A1 Jan. 12, 2006

Related U.S. Application Data

(63) Continuation of application No. 10/229,564, filed on Aug. 27, 2002, now Pat. No. 6,938,092, which is a continuation-in-part of application No. 09/801,488, filed on Mar. 7, 2001, now Pat. No. 6,687,758.

(51) Int. Cl.
 *G06F 15/16* (2006.01)
 *G06F 12/00* (2006.01)
(52) U.S. Cl. .................................. 709/250; 709/238
(58) Field of Classification Search .............. 709/230, 709/245, 236, 232, 217, 212, 250, 223–229, 709/238–244
See application file for complete search history.

(56) References Cited

U.S. PATENT DOCUMENTS

| | | | | |
|---|---|---|---|---|
| 4,366,538 | A | 12/1982 | Johnson et al. | 364/200 |
| 4,485,455 | A | 11/1984 | Boone et al. | 364/900 |
| 4,485,460 | A | 11/1984 | Stambaugh | 365/203 |
| 4,589,063 | A | 5/1986 | Shah et al. | 710/8 |
| 4,700,185 | A | 10/1987 | Balph et al. | 340/825.5 |
| 4,991,133 | A | 2/1991 | Davis et al. | 364/900 |

(Continued)

FOREIGN PATENT DOCUMENTS

WO     WO 98/19412     5/1998

(Continued)

OTHER PUBLICATIONS

Andrew S. Tanenbaum, Computer Networks, Third Edition, 1996, ISBN 0-13-349945-6.

(Continued)

*Primary Examiner*—Zarni Maung
(74) *Attorney, Agent, or Firm*—Mark Lauer; Silicon Edge Law Group LLP

(57) ABSTRACT

At least one intelligent network interface card (INIC) is coupled to a host computer to offload protocol processing for multiple network connections, reducing the protocol processing of the host. Plural network connections can maintain, via plural INIC ports and a port aggregation switch, an aggregate connection with a network node, increasing bandwidth and reliability for that aggregate connection. Mechanisms are provided for managing this aggregate connection, including determining which port to employ for each individual network connection, and migrating control of an individual network connection from a first INIC to a second INIC.

20 Claims, 1 Drawing Sheet

U.S. PATENT DOCUMENTS

| | | | |
|---|---|---|---|
| 5,056,058 A | 10/1991 | Hirata et al. | 709/230 |
| 5,058,110 A | 10/1991 | Beach et al. | 370/85.6 |
| 5,097,442 A | 3/1992 | Ward et al. | 365/78 |
| 5,163,131 A | 11/1992 | Row et al. | 395/200 |
| 5,212,778 A | 5/1993 | Dally et al. | 395/400 |
| 5,280,477 A | 1/1994 | Trapp | 370/85.1 |
| 5,289,580 A | 2/1994 | Latif et al. | 395/275 |
| 5,303,344 A | 4/1994 | Yokoyama et al. | 395/200 |
| 5,412,782 A | 5/1995 | Hausman et al. | 395/250 |
| 5,418,912 A | 5/1995 | Christenson | 395/200 |
| 5,448,566 A | 9/1995 | Richter et al. | 370/94.1 |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,517,668 A | 5/1996 | Szwerinski et al. | 395/800 |
| 5,524,250 A | 6/1996 | Chesson et al. | 395/775 |
| 5,535,375 A | 7/1996 | Eshel et al. | 391/500 |
| 5,548,730 A | 8/1996 | Young et al. | 395/280 |
| 5,566,170 A | 10/1996 | Bakke et al. | 370/60 |
| 5,574,919 A | 11/1996 | Netravali et al. | 395/561 |
| 5,588,121 A | 12/1996 | Reddin et al. | 395/200.15 |
| 5,590,328 A | 12/1996 | Seno et al. | 395/675 |
| 5,592,622 A | 1/1997 | Isfeld et al. | 395/200.02 |
| 5,598,410 A | 1/1997 | Stone | 370/469 |
| 5,619,650 A | 4/1997 | Bach et al. | 395/200.01 |
| 5,629,933 A | 5/1997 | Delp et al. | 370/411 |
| 5,633,780 A | 5/1997 | Cronin et al. | 361/220 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,682,534 A | 10/1997 | Kapoor et al. | 395/684 |
| 5,692,130 A | 11/1997 | Shobu et al. | 395/200.12 |
| 5,699,317 A | 12/1997 | Sartore et al. | 395/230.06 |
| 5,699,350 A | 12/1997 | Kraslavsky | 370/254 |
| 5,701,434 A | 12/1997 | Nakagawa | 395/484 |
| 5,701,516 A | 12/1997 | Cheng et al. | 395/842 |
| 5,727,142 A | 3/1998 | Chen | 395/181 |
| 5,742,765 A | 4/1998 | Wong et al. | 395/200 |
| 5,749,095 A | 5/1998 | Hagersten | 711/141 |
| 5,751,715 A | 5/1998 | Chan et al. | 370/455 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,768,618 A | 6/1998 | Erickson et al. | 395/829 |
| 5,771,349 A | 6/1998 | Picazo, Jr. et al. | 395/188.01 |
| 5,774,660 A | 6/1998 | Brendel et al. | 395/200.31 |
| 5,778,013 A | 7/1998 | Jedwab | 714/807 |
| 5,778,419 A | 7/1998 | Hansen et al. | 711/112 |
| 5,790,804 A | 8/1998 | Osborne | 709/245 |
| 5,794,061 A | 8/1998 | Hansen et al. | 395/800.01 |
| 5,802,258 A | 9/1998 | Chen | 395/182.08 |
| 5,802,580 A | 9/1998 | McAlpice | 711/149 |
| 5,809,328 A | 9/1998 | Nogales et al. | 395/825 |
| 5,809,527 A | 9/1998 | Cooper et al. | 711/133 |
| 5,812,775 A | 9/1998 | Van Seeters et al. | 395/200.43 |
| 5,815,646 A | 9/1998 | Purcell et al. | 395/163 |
| 5,828,835 A | 10/1998 | Isfeld et al. | 395/200.3 |
| 5,848,293 A | 12/1998 | Gentry et al. | 395/825 |
| 5,872,919 A | 2/1999 | Wakeland et al. | 395/200 |
| 5,878,225 A | 3/1999 | Bilansky et al. | 395/200.57 |
| 5,892,903 A | 4/1999 | Klaus | 395/187.01 |
| 5,898,713 A | 4/1999 | Melzer et al. | 371/53 |
| 5,913,028 A | 6/1999 | Wang et al. | 395/200.33 |
| 5,920,566 A | 7/1999 | Hendel et al. | 370/401 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,987,022 A | 11/1999 | Geiger et al. | 370/349 |
| 5,991,299 A | 11/1999 | Radogna et al. | 370/392 |
| 5,996,013 A | 11/1999 | Delp et al. | 709/226 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry et al. | 709/303 |
| 6,026,452 A | 2/2000 | Pitts | 710/56 |
| 6,034,963 A | 3/2000 | Minami et al. | 370/401 |
| 6,038,562 A | 3/2000 | Anjur et al. | 707/10 |
| 6,041,058 A | 3/2000 | Flanders et al. | 370/401 |
| 6,041,381 A | 3/2000 | Hoese | 710/129 |
| 6,044,438 A | 3/2000 | Olnowich | 711/130 |
| 6,047,356 A | 4/2000 | Anderson et al. | 711/129 |
| 6,049,528 A | 4/2000 | Hendel et al. | 370/235 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,067,569 A | 5/2000 | Khaki et al. | 709/224 |
| 6,070,200 A | 5/2000 | Gates et al. | 710/20 |
| 6,078,733 A | 6/2000 | Osborne | 395/200.8 |
| 6,097,734 A | 8/2000 | Gotesman et al. | 370/474 |
| 6,101,555 A | 8/2000 | Goshey et al. | 709/321 |
| 6,111,673 A | 8/2000 | Chang et al. | 359/123 |
| 6,115,615 A | 9/2000 | Ota et al. | 455/553 |
| 6,122,670 A | 9/2000 | Bennett et al. | 709/236 |
| 6,141,701 A | 10/2000 | Whitney | 710/5 |
| 6,141,705 A | 10/2000 | Anand et al. | 710/15 |
| 6,145,017 A | 11/2000 | Ghaffari | 710/5 |
| 6,157,944 A | 12/2000 | Pedersen | |
| 6,157,955 A | 12/2000 | Narad et al. | 709/228 |
| 6,172,980 B1 | 1/2001 | Flanders et al. | 370/401 |
| 6,173,333 B1 | 1/2001 | Jolitz et al. | |
| 6,181,705 B1 | 1/2001 | Kim | 370/392 |
| 6,202,105 B1 | 3/2001 | Gates et al. | 710/20 |
| 6,223,242 B1 | 4/2001 | Sheafor et al. | 710/132 |
| 6,226,680 B1 | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,279,051 B1 | 8/2001 | Gates et al. | 710/20 |
| 6,289,023 B1 | 9/2001 | Dowling et al. | 370/419 |
| 6,298,403 B1 | 10/2001 | Suri et al. | 710/100 |
| 6,324,649 B1 | 11/2001 | Eyres et al. | 713/202 |
| 6,334,153 B2 | 12/2001 | Boucher et al. | 709/230 |
| 6,343,360 B1 | 1/2002 | Feinleib | 713/1 |
| 6,345,301 B1 | 2/2002 | Burns et al. | 709/230 |
| 6,345,302 B1 | 2/2002 | Bennett et al. | 709/236 |
| 6,356,951 B1 | 3/2002 | Gentry et al. | 709/250 |
| 6,370,599 B1 | 4/2002 | Anand et al. | 710/15 |
| 6,385,647 B1 | 5/2002 | Willis et al. | 709/217 |
| 6,389,468 B1 | 5/2002 | Muller et al. | 709/226 |
| 6,389,479 B1 | 5/2002 | Boucher | 709/243 |
| 6,393,487 B2 | 5/2002 | Boucher et al. | 709/238 |
| 6,421,742 B1 | 7/2002 | Tillier | 710/1 |
| 6,421,753 B1 | 7/2002 | Hoese et al. | 710/129 |
| 6,427,169 B1 | 7/2002 | Elzur | 709/224 |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |
| 6,470,415 B1 | 10/2002 | Starr et al. | 711/104 |
| 6,473,425 B1 | 10/2002 | Bellaton et al. | 370/392 |
| 6,480,489 B1 | 11/2002 | Muller et al. | 370/389 |
| 6,487,202 B1 | 11/2002 | Klausmeier et al. | 370/395 |
| 6,487,654 B2 | 11/2002 | Dowling | 712/244 |

| | | | | |
|---|---|---|---|---|
| 6,490,631 B1 | 12/2002 | Teich et al. | | 709/250 |
| 6,502,144 B1 | 12/2002 | Accarie | | 710/8 |
| 6,523,119 B2 | 2/2003 | Pavlin et al. | | 713/192 |
| 6,526,446 B1 | 2/2003 | Yang et al. | | 709/230 |
| 6,570,884 B1 | 5/2003 | Connery et al. | | 370/419 |
| 6,591,302 B2 | 7/2003 | Boucher et al. | | 709/230 |
| 6,591,310 B1 | 7/2003 | Johnson | | 710/3 |
| 6,648,611 B2 | 11/2003 | Morse et al. | | 417/310 |
| 6,650,640 B1 | 11/2003 | Muller et al. | | 370/392 |
| 6,657,757 B1 | 12/2003 | Chang et al. | | 359/124 |
| 6,658,480 B2 | 12/2003 | Boucher et al. | | 709/239 |
| 6,678,283 B1 | 1/2004 | Teplitsky | | 370/463 |
| 6,681,364 B1 | 1/2004 | Calvignac et al. | | 714/776 |
| 6,687,758 B2 * | 2/2004 | Craft et al. | | 709/250 |
| 6,697,868 B2 | 2/2004 | Craft et al. | | 709/230 |
| 6,751,665 B2 | 6/2004 | Philbrick et al. | | 709/224 |
| 6,757,746 B2 | 6/2004 | Boucher et al. | | 709/250 |
| 6,765,901 B1 | 7/2004 | Johnson et al. | | 370/352 |
| 6,807,581 B1 | 10/2004 | Starr et al. | | 709/250 |
| 6,842,896 B1 | 1/2005 | Redding et al. | | 717/172 |
| 6,912,522 B2 | 6/2005 | Edgar | | 707/2 |
| 6,938,092 B2 * | 8/2005 | Burns | | 709/230 |
| 6,941,386 B2 | 9/2005 | Craft et al. | | 709/250 |
| 6,965,941 B2 | 11/2005 | Boucher et al. | | 709/230 |
| 6,996,070 B2 | 2/2006 | Starr et al. | | 370/252 |
| 7,042,898 B2 | 5/2006 | Blightman et al. | | 370/463 |
| 7,076,568 B2 | 7/2006 | Philbrick et al. | | 709/250 |
| 7,089,326 B2 | 8/2006 | Boucher et al. | | 709/242 |
| 7,093,099 B2 | 8/2006 | Bodas et al. | | 711/206 |
| 7,124,205 B2 | 10/2006 | Craft et al. | | 709/250 |
| 7,133,940 B2 | 11/2006 | Blightman et al. | | 710/22 |
| 7,167,926 B1 | 1/2007 | Boucher et al. | | 709/250 |
| 7,167,927 B2 | 1/2007 | Philbrick et al. | | 709/250 |
| 7,174,393 B2 | 2/2007 | Boucher et al. | | 709/250 |
| 7,185,266 B2 | 2/2007 | Blightman et al. | | 714/776 |
| 7,191,241 B2 | 3/2007 | Boucher et al. | | 709/230 |
| 7,191,318 B2 | 3/2007 | Tripathy et al. | | 712/225 |
| 7,237,036 B2 | 6/2007 | Boucher et al. | | 709/245 |
| 7,254,696 B2 | 8/2007 | Mittal et al. | | 712/210 |
| 7,284,070 B2 | 10/2007 | Boucher et al. | | 709/250 |
| 7,287,092 B2 * | 10/2007 | Sharp | | 709/245 |
| 2001/0004354 A1 | 6/2001 | Jolitz | | 370/328 |
| 2001/0013059 A1 | 8/2001 | Dawson et al. | | 709/217 |
| 2001/0014892 A1 | 8/2001 | Gaither et al. | | 707/200 |
| 2001/0014954 A1 | 8/2001 | Purcell et al. | | 714/4 |
| 2001/0025315 A1 | 9/2001 | Jolitz | | 709/231 |
| 2001/0048681 A1 | 12/2001 | Bilic et al. | | 370/389 |
| 2001/0053148 A1 | 12/2001 | Bilic et al. | | 370/389 |
| 2002/0073223 A1 | 6/2002 | Darnell et al. | | 709/232 |
| 2002/0112175 A1 | 8/2002 | Makofka et al. | | 713/200 |
| 2003/0066011 A1 | 4/2003 | Oren | | 714/758 |
| 2003/0110344 A1 | 6/2003 | Szezepanek et al. | | 711/100 |
| 2003/0140124 A1 * | 7/2003 | Burns | | 709/220 |
| 2003/0165160 A1 | 9/2003 | Minami et al. | | 370/466 |
| 2004/0054814 A1 | 3/2004 | McDaniel | | |
| 2004/0059926 A1 | 3/2004 | Angelo et al. | | 713/168 |
| 2004/0062245 A1 * | 4/2004 | Sharp et al. | | 370/392 |
| 2004/0153578 A1 | 8/2004 | Elzur | | |
| 2004/0213290 A1 | 10/2004 | Johnson et al. | | 370/469 |
| 2004/0246974 A1 | 12/2004 | Gyugyi et al. | | 370/395.31 |

FOREIGN PATENT DOCUMENTS

| | | |
|---|---|---|
| WO | WO 98/50852 | 11/1998 |
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |
| WO | WO 01/59966 | 8/2001 |
| WO | WO 01/86430 | 11/2001 |

OTHER PUBLICATIONS

Article from Rice University entitled "LRP: A New Network Subsystem Architecture for Server Systems", by Peter Druschel and Gaurav Banga, 14 pages.

Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.

WindRiver article entitled "Tornado: For Intelligent Network Acceleration", copyright Wind River Systems, 2001, 2 pages.

WindRiver White Paper entitled "Complete TCP/IP Offload for High-Speed Ethernet Networks", Copyright Wind River Systems, 2002, 7 pages.

Intel article entitled "Solving Server Bottlenecks with Intel Server Adapters", Copyright Intel Corporation, 1999, 8 pages.

U.S. Provisional Patent Application No. 60/053,240, Titled: TCP/IP Network Accelerator and Method of Use, Filed Jul. 17, 1997, Inventor: William Jolizt et al.

Thia et al. Publication entitled "A Reduced Operational Protocol Engine (ROPE) for a multiple-layer bypass architecture," Protocols for High Speed Networks, pp. 224-239, 1995.

Form 10-K for Exelan, Inc., for the fiscal year ending Dec. 31, 1987 (10 pages).

Form 10-K for Exelan, Inc., for the fiscal year ending Dec. 31, 1988 (10 pages).

Internet pages entitled "Hardware Assisted Protocol Processing", (which Eugene Feinber is working on), 1 page, printed Nov. 25, 1998.

Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.

Internet pages entitled: Asante and 100BASE-T Fast Ethernet. 7 pages, printed May 27, 1997.

Internet pages entitled: A Guide to the Paragon XP/S-A7 Supercomputer at Indiana University. 13 pages, printed Dec. 21, 1998.

Richard Stevens, "TCP/IP Illustrated, vol. 1, The Protocols", pp. 325-326 (1994).

Internet pages entitled: Northridge/Southbridge vs. Intel Hub Architecture, 4 pages, printed Feb. 19, 2001.

Gigabit Ethernet Technical Brief, Achieving End-to-End Performance. Alteon Networks, Inc., First Edition, Sep. 1996, 15 pages.

Internet pages directed to Technical Brief on Alteon Ethernet Gigabit NIC technology, www.alteon.com; 14 pages, printed Mar. 15, 1997.

VIA Technologies, Inc. article entitled "VT8501 Apollo MVP4", pages i-iv, 1-11, cover and copyright page, revision 1.3, Feb. 1, 2000.

iReady News Archives article entitled "iReady Rounding Out Management Team with Two Key Executives", http://www.ireadyco.com/archives/keyexec.html, 2 pages, printed Nov. 28, 1998.

"Toshiba Delivers First Chips to Make Consumer Devices Internet-Ready Based On iReady's Design," Press Release Oct. 1998, 3 pages, printed Nov. 28, 1998.

Internet pages from iReady Products, web sitehttp://www.ireadyco.com/products,html, 2 pages, downloaded Nov. 25, 1998.

iReady News Archives, Toshiba, iReady shipping Internet chip, 1 page, printed Nov. 25, 1998.

Interprophet article entitled "Technology", http://www.interprophet.com/technology.html, 17 pages, printed Mar. 1, 2000.

iReady Corporation, article entitled "The I-1000 Internet Tuner", 2 pages, date unknown.

iReady article entitled "About Us Introduction", Internet pages fromhttp://www.iReadyco.com/about.html, 3 pages, printed Nov. 25, 1998.

iReady News Archive article entitled "Revolutionary Approach to Consumer Electronics Internet Connectivity Funded", San Jose, CA, Nov. 20, 1997. 2 pages, printed Nov. 2, 1998.

iReady News Archive article entitled "Seiko Instruments Inc. (SII) Introduces World's First Internet-Ready Intelligent LCD Modules Based on iReady Technology," Santa Clara, CA and Chiba, Japan, Oct. 26, 1998. 2 pages, printed Nov. 2, 1998.

NewSwatch article entitled "iReady internet Tuner to Web Enable Devices", Tuesday, Nov. 5, 1996, printed Nov. 2, 1998, 2 pages.
EETimes article entitled "Tuner for Toshiba, Toshiba Taps iReady for Internet Tuner", by David Lammers, 2 pages, printed Nov. 2, 1998.
"Comparison of Novell Netware and TCP/IP Protocol Architectures", by J.S. Carbone, 19 pages, printed Apr. 10, 1998.
Adaptec article entitled "AEA-7110C-a DuraSAN product", 11 pages, printed Oct. 1, 2001.
iSCSI HBA article entitled "iSCSI and 2Gigabit fibre Channel Host Bus Adapters from Emulex, QLogic, Adaptec, JNI", 8 pages, printed Oct. 1, 2001.
iSCSI HBA article entitled "FCE-3210/6410 32 and 64-bit PCI-to-Fibre Channel HBA", 6 pages, printed Oct. 1, 2001.
ISCSI.com article entitled "iSCSI Storage", 2 pages, printed Oct. 1, 2001.
"Two-Way TCP Traffic Over Rate Controlled Channels: Effects and Analysis", by Kalampoukas et al., IEEE Transactions on Networking, vol. 6, No. 6, Dec. 1998, 17 pages.
IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.
Internet pages of InterProphet entitled "Frequently Asked Questions", by Lynne Jolitz, printed Jun. 14, 2000, 4 pages.
"File System Design For An NFS File Server Appliance", Article by D. Hitz, et al., 13 pages.
Adaptec Press Release article entitled "Adaptec Announces EtherStorage Technology", 2 pages, May 4, 2000, printed Jun. 14, 2000.
Adaptec article entitled "EtherStorage Frequently Asked Questions", 5 pages, printed Jul. 19, 2000.
Adaptec article entitled "EtherStorage White Paper", 7 pages, printed Jul. 19, 2000.
CIBC World Markets article entitled "Computers; Storage", by J. Berlino et al., 9 pages, dated Aug. 7, 2000.
Merrill Lynch article entitled "Storage Futures", by S. Milunovich, 22 pages, dated May 10, 2000.
CBS Market Watch article entitled "Montreal Start-Up Battles Data Storage Botttleneck", by S. Taylor, dated Mar. 5, 2000, 2 pages, printed Mar. 7, 2000.
Internet-draft article entitled "SCSI/TCP (SCSI over TCP)", by J. Satran et al., 38 pages, dated Feb. 2000, printed May 19, 2000.
Internet pages entitled Technical White Paper-Xpoint's Disk to LAN Acceleration Solution for Windows NT Server, printed Jun. 5, 1997, 15 pages.
Jato Technologies article entitled Network Accelerator Chip Architecture, twelve-slide presentation, printed Aug. 19, 1998, 13 pages.

EETimes article entitled Enterprise System Uses Flexible Spec, dated Aug. 10,1998, printed Nov. 25, 1998, 3 pages.
Internet pages entitled "Smart Ethernet Network Interface Cards", which Berend Ozceri is developing, printed Nov. 25, 1998, 2 pages.
Internet pages of Xaqti corporation entitled "GigaPower Protocol Processor Product Review," printed Nov. 25, 1999, 4 pages.
U.S. Provisional Patent Application No. 60/283,896, Titled: CRC Calculations for Out of Order PUDs, Filed Apr. 12, 2003, Inventor: Amit Oren, Assignee: Siliquent Technologies Ltd.
Internet pages entitled "Dart: Fast Application Level Networking via Data-Copy Avoidance," by Robert J. Walsh, printed Jun. 3, 1999, 25 pages.
Rice University article entitled "LRP: A Network Subsystem Architecture for Server Systems", by P. Druschel and G. Banga, 14 pages.
Internet RFC/STD/FYI/BCP Archives article with heading "RFC2140" entitled "TCP Control Block Interdependence", web address http://www.faqs.org/ftp/rfc/pdf/rfc2140.txt.pdf, 11 pages, Apr. 1997.
Schwaderer et al., IEEE Computer Society Press publication entitled, "XTP in VLSI Protocol Decomposition for ASIC Implementation", from $15^{th}$ Conference on Local Computer Networks, 5 pages, Sep. 30—Oct. 3, 1990.
Beach, Bob, IEEE Computer Society Press publication entitled, "UltraNet: An Architecture for Gigabit Networking", from $15^{th}$ Conference on Local Computer Networks, 18 pages, Sep. 30—Oct. 3, 1990.
Chesson et al., IEEE Syposium Record entitled, "The Protocol Engine Chipset", from Hot Chips III, 16 pages, Aug. 26-27, 1991.
Maclean et al., IEEE Global Telecommunications Conference, Globecom '91, presentation entitled, "An Outboard Processor for High Performance Implementation of Transport Layer Protocols", 7 pages, Dec. 2-5, 1991.
Ross et al., IEEE article entitled "FX1000: A high performance single chip Gigabit Ethernet NIC", from Compcon '97 Proceedings, 7 pages, Feb. 23-26, 1997.
Strayer et al., "Ch. 9: The Protocol Engine" from XTP: The Transfer Protocol, 12 pages, Jul. 1992.
Publication entitled "Protocol Engine Handbook", 44 pages, Oct. 1990.
Koufopavlou et al., IEEE Global Telecommunications Conference, Globecom '92, presentation entitled, "Parallel TCP for High Performance Communication Subsystems", 7 pages, Dec. 6-9, 1992.
Lilienkamp et al., Publication entitled "Proposed Host-Front End Protocol", 56 pages, Dec. 1984.
Thla, Y.H. Publication entitled A Reduced Operational Protocol Engine (ROPE) for a multiple-layer bypass architecture, 16 pages.

* cited by examiner

US 7,640,364 B2

PORT AGGREGATION FOR NETWORK CONNECTIONS THAT ARE OFFLOADED TO NETWORK INTERFACE DEVICES

CROSS-REFERENCE TO RELATED APPLICATIONS

This application claims the benefit under 35 U.S.C. §120 of (is a continuation of) U.S. patent application Ser. No. 10/229,564, filed Aug. 27, 2002 now U.S. Pat. No. 6,938,092, which claims the benefit under 35 U.S.C. §120 of (is a continuation-in-part of) Ser. No. 09/801,488 now U.S. Pat. No. 6,687,758, filed Mar. 7, 2001. The entire disclosures of the above-referenced patent and application are incorporated by reference into the present application.

COPYRIGHT NOTICE

A portion of the disclosure of this patent document contains material that is subject to copyright protection. The copyright owner has no objection to the reproduction of the patent document or the patent disclosure in exactly the form it appears in the Patent and Trademark Office patent file or records, but otherwise reserves all copyright rights whatsoever.

BACKGROUND

The present invention relates to network communications, in particular to network systems for which a network node maintains more than one connection with another network node.

Port aggregation (also called link aggregation, teaming or trunking) is a method by which two or more network connections are grouped together at a multiport network host to create a single logical connection. One purpose of this grouping is to be able to increase bandwidth for that single logical connection without having to increase the bandwidth of any of the physical network channels. For example, full-duplex Ethernet or Fast-Ethernet connections can be grouped in this fashion to avoid or delay upgrading a network infrastructure to Gigabit Ethernet or asynchronous transfer mode (ATM).

Typically associated with port aggregation is a port fail-over method that ensures that the logical connection is maintained in the event that an individual network link or network interface card (NIC) fails. Such a port fail-over method can also provide increased reliability for that single logical network connection, in comparison with the reliability of a single physical network connection.

To provide an increased number of connections for a network host, the host may be connected to plural networks with plural NICs. A port aggregated logical connection may in this case involve plural ports of the plural NICs. The use of plural NICs may, however, strain a host central processing unit (CPU) due to the additional network protocol processing required for the additional NICs.

Even without additional NICs, protocol processing may absorb a large fraction of host CPU cycles. This is because conventionally, data such as a file that is transferred over a network is divided into multiple packets, with each packet having layers of protocol headers that are processed one layer at a time by the CPU of the receiving host computer. Although the speed of CPUs has greatly increased over many years, host protocol processing of network messages such as file transfers can consume most of the available processing power of the fastest commercially available CPU.

SUMMARY

In accordance with the present invention, at least one intelligent network interface card (INIC) is coupled to a host computer to offload protocol processing for multiple network connections, reducing the protocol processing of the host. Plural network connections can maintain, via plural INIC ports and a port aggregation switch, an aggregate connection with a network node, increasing bandwidth and reliability for that aggregate connection. Mechanisms are provided for managing this aggregate connection, including determining which port to employ for each individual network connection, and migrating control of an individual network connection from a first INIC to a second INIC.

DETAILED DESCRIPTION OF THE PREFERRED EMBODIMENTS

Figure 1:
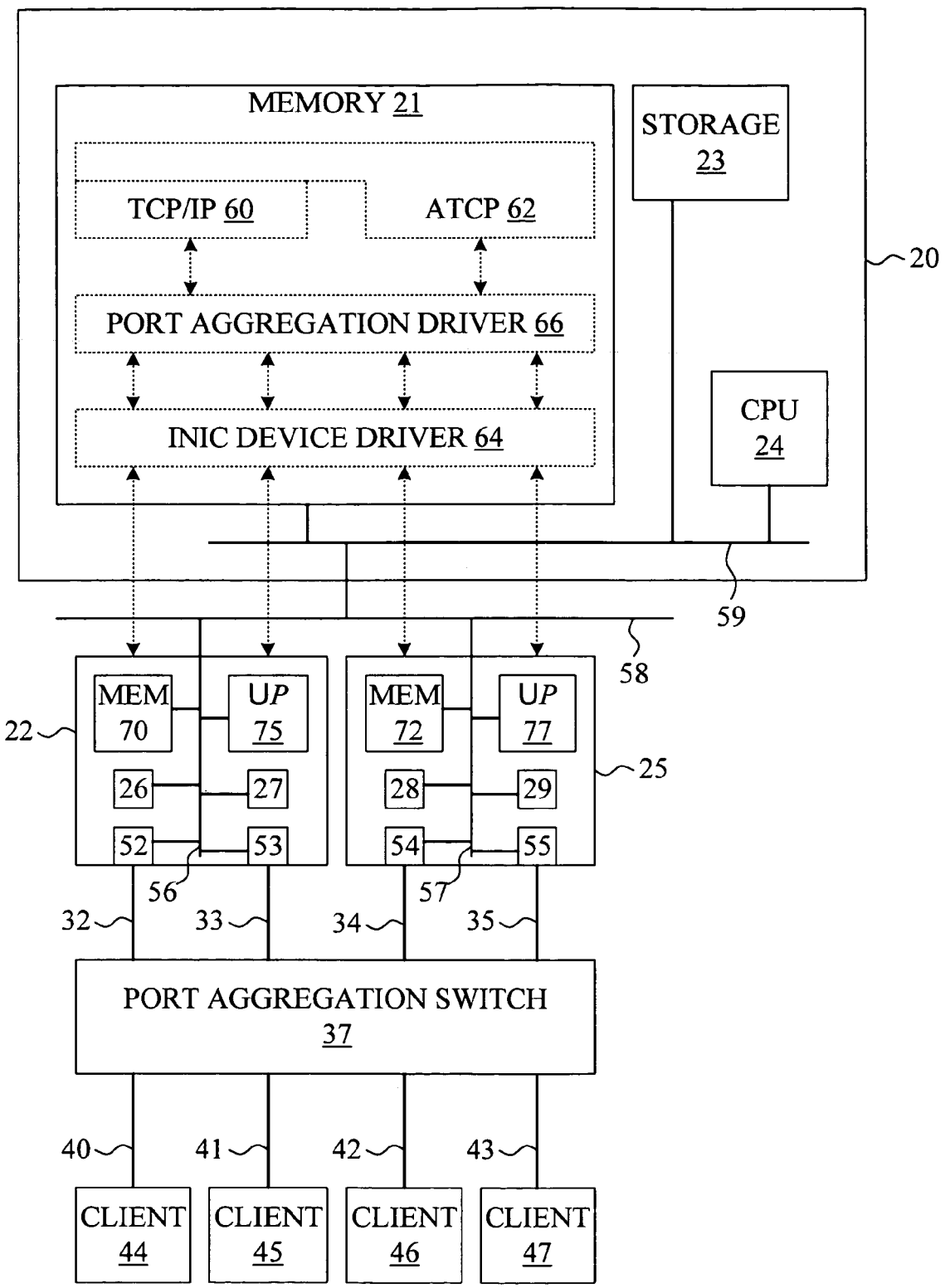
FIG. 1 is a block diagram of a host computer having plural INICs connected to a network by a port aggregation switch, the host including a port aggregation program that manages the logical connections of the INICs.

FIG. 1 is a block diagram of a host computer 20 having a CPU 24, a memory 21, storage 23, a first INIC 22 and a second INIC 25. Note that, although storage 23 is shown separately from memory 21, both may simply be separate categories of the same memory. First INIC 22 is coupled to network channels 32 and 33 by network ports 52 and 53, and second INIC 25 is coupled to network channels 34 and 35 by network ports 54 and 55. Network ports 52-55 each include an encoding/decoding mechanism and a physical interface that is coupled to a respective network channel 32-35. Although FIG. 1 illustrates an embodiment with two INICs each having two ports, more or less INICs each having more or less ports are possible. Network channels 32-35, which may each comprise conductive wires, optical fibers, or wireless transmission media, are coupled to a port aggregation switch 37.

The port aggregation switch 37 may be coupled to a number of other network channels 40-43, which may also comprise conductive wires, optical fibers, or wireless transmission media. Although only a few network channels 40-43 are shown in this illustration, switch 37 may include tens or hundreds of physical connections. Clients 44-47 are coupled to switch 37 via network channels 40-43, respectively. Although represented as a few network channels 40-43 directly connected to clients 44-47 to facilitate illustration, the network channels 40-43 may each include multiple packet-switched interconnections between switch 37 and clients 44-47. Likewise, clients 44-47 may represent any network nodes including peer level hosts that may have multiple physical network interfaces. Similarly, the host computer 20 may represent any computing or communication device that has a CPU and a memory and is able to be coupled to a network as a node.

Network connections, such as Transmission Control Protocol (TCP) connections, may be initiated between the host 20 and any of clients 44-47. The network connections typically define the network addresses and the relevant network ports of both the host 20 and client 44, 45, 46 or 47, but do not necessarily define the network path connecting the host and client for those ports, and so may be thought of as logical connections. The port aggregation switch 37 can combine plural network connections, each of which is set up to communicate over a different one of the network ports 52-55 and channels 32-35, into a single aggregate interface that communicates with client 44, 45, 46 or 47 via respective network channel 40, 41, 42 or 43.

The INICs 22 and 25 are connected to the host 20 by a conventional bus 58, which may be a host bus or an input/output (I/O) bus such as a peripheral component interconnect (PCI) bus. Alternatively, INICs 22 and 25 may be connected to the host 20 by plural I/O buses. For the situation in which bus 58 is an I/O bus, internal INIC memory buses 56 and 57 and host memory bus 59 may be coupled to I/O bus 58 with conventional interface mechanisms. The INICs 22 and 25 have protocol processing mechanisms 26-29 that process data link, network and transport layer headers of each packet received by that INIC. INICs 22 and 25 also have respective memories 70 and 72 and respective microprocessors 75 and 77.

The host memory 21 contains a conventional protocol processing stack 60 that can be run by CPU 24 to process various communication protocols (e.g., IP, TCP, UDP, IPX, SPX, HTTP, etc.), an ATCP protocol processing stack 62 and an INIC device driver 64. The ATCP protocol stack 62 is used to offload selected network connections to the INICs 22 and 25 for fast-path processing of messages corresponding to those selected connections, while the conventional stack 60 is available for slow-path processing of other messages. The INIC device driver 64 diverts fast-path packets received from the INICs 22 and 25 to the ATCP stack 62 for processing, such as connection setup. The ATCP stack 62 also intercepts outgoing fast-path messages from being processed by the conventional TCP/IP stack 60. Source code for an embodiment of the ATCP stack 62 that works with Windows NT is contained in the CD-R Disc provided with this specification, in a folder entitled "nt-parallel-stack."

Alternatively, ATCP functions such as creating and handing out fast-path connections to INICs 22 and 25 may be included in an integrated protocol stack that also includes instructions for conventional protocol processing, as described in U.S. patent application Ser. No. 09/514,425, filed Feb. 28, 2000 and incorporated by reference herein. Source code for an integrated Free BSD stack is contained in the CD-R Disk Disc provided with this specification, in a folder entitled "freebsd-integrated-stack." In another embodiment, fast-path connection setup and tear down may be handled by INICs 22 and 25, as described in U.S. Patent Application Ser. No. 09/675,484 and U.S. Patent Application Ser. No., both filed Sep. 29, 2000, and incorporated by reference herein.

INIC 22 chooses whether to send a packet received from a network channel 32-35 to the host memory 21 for slow-path processing of the headers by the CPU 24 running protocol stack 60 or 62, or to send the packet data directly to a destination in storage 23. The fast-path may be selected for the vast majority of data traffic having plural packets per message that are sequential and error-free. The fast-path avoids the time consuming protocol processing of each packet by the CPU 24, such as repeated copying of the data and repeated trips across the host memory bus 59. Slow-path processing allows any packets that are not conveniently transferred by the fast-path of the INIC 22 to be processed conventionally by the host 20.

In order to provide fast-path capability at the host 20, a logical connection is first set up with a remote node such as client 44. This connection initialization may include handshake, authentication and/or other procedures. A communication control block (CCB) is created by the ATCP stack 62 during connection initialization procedures for connection-based messages, such as typified by TCP/IP or SPX/IPX protocols. The CCB includes connection information, such as source and destination addresses and ports. For TCP connections a CCB comprises source and destination media access control (MAC) addresses, source and destination Internet Protocol (IP) addresses, source and destination TCP ports and TCP variables such as timers and receive and transmit windows for sliding window protocols. After a connection has been set up, the CCB is passed by INIC device driver 64 from the host 20 to the INIC memory 70 by writing to a command register in that memory 70, where it may be stored along with other CCBs in a CCB cache. The INIC 22 also creates a hash table corresponding to the cached CCBs for accelerated matching of the CCBs with packet summaries.

When a message, such as a file write, that corresponds to the CCB is received by the INIC 22, a header portion of an initial packet of the message is sent to the host 20 to be processed by the CPU 30 and protocol stack 38. This header portion sent to the host contains a session layer header for the message, which is known to begin at a certain offset of the packet, and optionally contains some data from the packet. The processing of the session layer header by ATCP stack 62 identifies the data as belonging to the file and indicates the size of the message, which are used by a host 20 file system to reserve a destination for the data in storage 23. If any data was included in the header portion that was sent to the host, it is then stored in the destination.

A list of buffer addresses for the destination in storage 23 is sent to the INIC 22 and stored in or along with the CCB. The CCB also maintains state information regarding the message, such as the length of the message and the number and order of packets that have been processed, providing protocol and status information regarding each of the protocol layers, including which user is involved and storage space for per-transfer information.

Once the CCB indicates the destination, fast-path processing of received packets corresponding to the CCB is available. A packet received subsequently at port 52 is first processed by mechanism 26 to generate the packet summary, a hash of the packet summary is compared with the hash table, and if necessary with the CCBs cached in memory 70, to determine whether the packet belongs to a message for which a fast-path connection has been set up. Upon matching the packet summary with the CCB, assuming no exception conditions exist, the data of the packet, without network or transport layer headers, is sent by direct memory access (DMA) units to the destination in storage 23 denoted by the CCB, which may for example be a file cache for an application.

Likewise, fast-path messages to be transmitted from the host 20 to the client 44 are diverted from an application interface to the ATCP protocol processing stack 62, which sends the message data to the INIC 22 or 25 that is holding the CCB for that message. That INIC references the CCB to prepend TCP and IP headers to data packets and sends the packets on the corresponding network channel. The ATCP stack 62 remains available for slow-path processing of any fast-path type packet or message that has exception conditions. A more detailed discussion of the above-described accelerated communication mechanism, which speeds protocol processing and reduces work for the host CPU 24, can be found in U.S. patent application Ser. No. 60/061,809, U.S. patent application Ser. No. 09/067,544, U.S. patent application Ser. No. 60/098,296, U.S. patent application Ser. No. 09/141,713, U.S. patent application Ser. No. 09/384,792, U.S. patent application Ser. No. 09/439,603, U.S. patent application Ser. No. 09/464,283, U.S. patent application Ser. No. 09/692,561, U.S. patent application Ser. No. 09/748,936 and the U.S. patent application filed Feb. 20, 2001, by Express Mail No. EF055069864US, inventors Laurence B. Boucher et al., entitled "Obtaining a Destination Address so that a Network Interface Device can Write Network Data Without Headers Directly into Host Memory," all of which are incorporated by reference herein.

In accordance with a port aggregation protocol, the port aggregation switch 37 controls which network ports 52-55 are associated with a network such as channel 40. That is, port aggregation switch 37 may move a connection from one to another of ports 52-55. Since the fast-path conditions described above involve offloading control and processing of a connection to INIC 22 or 25 in association with ports 52 and 53 or 54 and 55, respectively, the fast-path and port aggregation protocol need to be synchronized.

A port aggregation and fail-over scheme that may be used by switch 37 is referenced in IEEE standard 802.3ad, which is incorporated by reference herein. A similar type of port aggregation and fail-over scheme is called "Fast Etherchannel," promoted by Cisco Systems®. Fast Etherchannel combines plural network ports into a single logical interface. In the Fast Etherchannel implementation, each of the ports in the logical group shares the same MAC address. Because of this, each of the ports is connected to a single Fast Etherchannel switch (such as the Cisco Catalyst™ series switch). If a link such as one of channels 32-35, ports 52-55 or INICs 22,25 fails in a fast Etherchannel group, host 20 and switch 37 each independently identify the link failure and switch to another link. Alternatively, port aggregation switch 37 may attempt to balance the traffic on the network ports 52-55 that are associated with network channels 40-43.

A port aggregation driver 66 is disposed between the INIC device driver 64 and the protocol processing stacks 60 and 62 to handle the port aggregation requirements imposed by the switch 37. For example, if the switch 37 migrates a fast-path connection from port 52 on INIC 22 to port 54 on INIC 25, the port aggregation driver 66 can recognize the migration and transfer the corresponding CCB from first INIC 22 to second INIC 25. Source code for the port aggregation driver 66 is contained in the CD-R Disk provided with this specification, in a folder entitled "pag" located in the folder entitled "nt-parallel-stack."

The port aggregation driver 66 is transparent to upper protocol layers such as TCP/IP stack 60, ATCP stack 62, or integrated Free BSD stack. That is, the upper protocol layers are not aware that they are communicating across a logical group of network interfaces. This is illustrated in FIG. 1 with the single arrow leading between TCP/IP stack 60 and port aggregation driver 66, compared with four arrows leading between port aggregation driver 66 and INIC device driver 64. Likewise, a single arrow leading between ATCP stack 62 and port aggregation driver 66 illustrates the communication between plural ports 52-55 of plural INICs 22, 25 and the single ATCP stack 62. The INIC device driver 64 can control INICs 22 and 25 with signals flowing from port aggregation driver 66. For the situation in which port aggregation is not being used, the port aggregation driver 66 is not active.

As mentioned above, port aggregation and fail-over switching mechanisms are provided across multiple INICs notwithstanding individual INIC control and processing of each fast-path connection. Thus a fast-path message transfer can be interrupted by port aggregation switch 37 deciding to move a fast-path connection to another INIC. Communicating a message using a fast-path connection may involve a large block of data, such as a Server Message Block (SMB) write or read, that is divided into multiple 64 kilobyte (KB) messages, which are further divided into multiple 1.4KB packets for network transfer according to IP. For example, host 20 may wish to issue a write to client 44, for a connection corresponding to a CCB held on INIC 22. INIC 22 will split the data into TCP packets and transmit the packets according to the TCP sliding window protocol. In order to do this, INIC 22 also processes the acknowledgments returned by the client. Since the CCB for the connection resides on INIC 22, it is helpful for all acknowledgments for that CCB to be sent to INIC 22.

As noted above, however, the port aggregation switch 37 may be configured to decide which of the network channels 32-35 and ports 52-55 is to receive a particular packet. It is difficult in this port aggregation environment for host 20 or INICs 22 and 25 to predict a priori on which port a packet for a given logical connection will arrive. Instead, the port aggregation driver 66 monitors the network traffic received by INICs 22 and 25 to keep track of which logical connections, identified by the MAC address of client 44, are associated with which of the ports 52-55.

With information regarding the port 52, 53, 54 or 55 that is associated with a logical connection for client 44, the port aggregation driver 66 can mimic the port aggregation switch 37 by handing out a CCB to the port 52, 53, 54 or 55 associated with the destination MAC address. This information may be gleaned, for example, from a connection initialization handshake or from initial replies to a write or read request. Until the port aggregation driver 66 has identified which port is associated with a logical connection, fast-path processing of a message corresponding to that connection is averted. Averting fast-path processing may be accomplished simply by the port aggregation driver 66 identifying CCB handout attempts of the ATCP stack 62 and failing them until the driver 66 has identified which of the ports 52, 53, 54 or 55 is associated with the connection. The ATCP driver 62 may be configured to delay subsequent handout attempts to avoid thrashing. Once a port 52, 53, 54 or 55 is associated with a connection then the CCB handout is allowed to succeed, providing fast-path processing of messages, such as the SMB write, by INIC 22 or 25.

After this fast-path processing has begun, however, port aggregation switch 37 may change the port selection for load balancing purposes, so long as the switch can guarantee that packets are not sent out of order. This is one mechanism by which INIC 22, for example, can receive a packet for a fast-path connection that is being handled by the other INIC 25.

In this case the INIC 22 that receives the packet cannot process the packet according to the fast-path connection, and instead sends the packet to the INIC device driver 64, which is configured to divert fast-path type message packets to the ATCP stack 62 for processing. The ATCP stack 62 maintains a list of the CCBs that have been offloaded to INICs 22 and 25, and recognizes that this slow-path packet corresponds to a CCB that is in a fast-path state. Upon receiving this exception condition, the ATCP stack 62 will command the INIC 25 to flush the fast-path CCB back to the ATCP stack 62. After the packet has been processed by the ATCP stack 62 and the state of the CCB updated to reflect that processing, the CCB can then be handed out to the INIC 22, which is known by port aggregation driver 66 to be associated with the connection.

When the port aggregation driver 66 receives a slow-path send request, it extracts the destination MAC address from the packet to determine which INIC and corresponding port 52, 53, 54 or 55 should be used to send the packet. For send requests corresponding to a CCB held by an INIC 22 or 25, the port aggregation driver 66 may not receive this information. Instead, a connection handle is created to identify a particular fast-path connection. The connection handle is in one embodiment a 4-byte value made up the following four 1-byte values:

1. Connection identifier—This identifies the CCB on the INIC 22 or 25. In one embodiment, up to 256 CCBs can be held per INIC.

2. INIC number—This identifies the INIC (e.g., 22 or 25) associated with the fast-path connection.

3. Port number—This identifies the port (e.g., 52, 53, 54 or 55) associated with the connection by its number on a given INIC.

4. Generation number—A number used for indicating INIC failure, discussed below.

The connection handle is set by the INIC device driver 64 during CCB handout and passed back up to the ATCP stack 62 as an opaque handle. The ATCP stack 62 uses this handle for all subsequent fast-path requests for that logical connection.

During connection handout, the ATCP stack 62 provides the destination MAC address as part of the handout. The port aggregation driver 66 intercepts the destination MAC address as the request is being passed down from the ATCP stack 62 to the INIC device driver 64. Similarly, the port aggregation driver 66 intercepts the connection handle as the completion is passed back up from the INIC device driver 64 to the ATCP stack 62. The port aggregation driver 66 uses information from the MAC address and connection handle to identify which fast-path requests belong to which port and INIC.

Other issues that are solved in accordance with the present invention include the handling of a link failure for a fast-path connection. There are two ways in which a link failure can occur. One way is for the host 20 to receive a link status signal indicating that the link has failed. Another way is for the INIC handling the link (or links) to crash. Both of these fail-over scenarios are discussed separately below.

For connections that are operating in slow-path mode, handling a link failure is simple. Link failure is identified by the INIC 22 or 25, which notifies the INIC device driver 64 via an interrupt status register. The INIC device driver 64 in response issues a media disconnect status indication to the protocol drivers above it, including the port aggregation driver 66. Upon receiving the media disconnection indication, the port aggregation driver 66 notes the affected port 52, 53, 54 or 55 and refrains from sending subsequent slow-path packets out that port. Until a new port is associated with a particular connection (as described above) the port aggregation driver selects an outgoing port based on the lower bits of the destination MAC address.

Ownership of connections by INIC 22 or 25 complicates handling a link failure for fast-path mode connections. If a link failure results in the connection being associated with a link on the other INIC 22 or 25, the CCB is flushed back to the host 20 and then handed out to the other INIC. The port aggregation driver 66 may include instructions to flush the fast-path CCB back to the host 20 when a link fails.

Alternatively, instructions on the port aggregation switch 37 and ATCP stack 62 may manage the link failure without intervention by the port aggregation driver 66. In this case, link failure may be handled by different mechanisms. First, the port aggregation switch 37 may discover the link failure and switch the connection to a new port 52, 53, 54 or 55. If the new port is on a different INIC 22 or 25, then the ATCP stack 62 will receive slow-path packets for a fast-path connection, in which case it will flush the CCB from the INIC associated with the link failure. Second, a TCP retransmission timer on the INIC may be triggered, also causing the CCB to be flushed to the host from the INIC associated with the link failure.

Certain operating system controls, however, may interfere with the above mechanisms. For example, Windows NT or 2000 network driver interface specification (NDIS), upon receiving an indication from INIC device driver 64 that a link has failed, may prohibit protocol stacks such as ATCP 62 from sending commands such as a flush command to the INIC device driver. For this situation, the INIC device driver 64 instead may be configured to issue a flush command to the appropriate INIC 22 or 25 when alerted of a link failure by that INIC.

Failure of one of the INICs 22 or 25 is more difficult to manage. The difficulty is in recovering the CCBs that have been offloaded to the failed INIC. If the INIC 22 or 25 is no longer functional, then the INIC cannot flush the CCBs back to the host. It may be possible to read the CCBs out of SRAM on the INIC, but if the state of the INIC is suspect, then the state of the CCBs is also suspect. Instead, a safer procedure is to close all CCBs on the failed INIC.

Some upper layer protocols, such as Netbios, reopen connections automatically. As such, a host 20 with SMB mapped file systems should not experience a loss of connectivity. Other sessions, such as File Transfer Protocol (FTP), may have to be reestablished by the host 20. One challenge is for the ATCP stack 62 to determine which connections need to be terminated and which do not. Although it may be possible to explicitly tell the ATCP stack 62 which connections need to be flushed, this may involve the INIC device driver 64 issuing some sort of custom status indication to the ATCP stack 62, which may be undesirable.

Instead, the INIC device driver 64 maintains a generation number, as mentioned above, for each INIC 22 and 25. This generation number gets incremented every time the INIC gets reset. The generation number gets passed up to the ATCP driver as part the previously mentioned connection handle during CCB handout. On every subsequent fast-path request, the ATCP stack 62 passes this opaque handle back down to the INIC device driver 64. If the INIC device driver 64 gets a request with a stale generation number, as the result of an INIC reset, the INIC device driver 64 will fail the fast path request. When the ATCP stack 62 discovers that the fast-path request failed it will know that it must abort the TCP connection.

Note that it is possible that the ATCP stack 62 already has an outstanding command on INIC 22 or 25 at the time that INIC fails. Without further information, the ATCP stack 62 could end up waiting indefinitely for the command to complete. For this reason, the ATCP stack 62 implements a fast-path command timeout. When the timeout expires, the ATCP stack 62 will attempt to flush the connection. If the flush fails (due to the generation number) or times out, then it will abort the connection.

Although we have described in detail various embodiments of the present invention, other embodiments and modifications will be apparent to those of skill in the art in light of this text and accompanying drawings. Therefore, the present invention is to be limited only by the following claims, which include all such embodiments, modifications and equivalents.

The invention claimed is:

1. A method for communicating over a network by a local host having a plurality of ports that couple the host to at least one network, the method comprising:

establishing a transport layer connection between the local host and a remote host;

offloading the connection to a first of the ports, including transmitting all network packets that correspond to the connection via the first port while the connection is associated with the first port;

receiving a network packet that corresponds to the connection via a second of the ports; and transferring the connection to the second port, including transmitting all network packets that correspond to the connection via the second port while the connection is associated with the second port.

2. The method of claim 1, wherein transferring the connection to the second port includes:

transferring the connection from the first port to the host; and transferring the connection from the host to the second port.

3. The method of claim 1, wherein transferring the connection to the second port is based upon receiving the network packet that corresponds to the connection via the second port.

4. The method of claim 1, further comprising:

recognizing, by a set of instructions running on a processor, that the network packet was received via a port that is not associated with the connection.

5. The method of claim 1, further comprising:

creating, by the local host, a handle that identifies the connection and the port that is associated with the connection.

6. The method of claim 1, wherein the local host has first and second network interface cards, and transferring the connection to the second port includes transferring the connection from the first network interface card to the second network interface card.

7. The method of claim 1, further comprising:

receiving, by a switch that is coupled to the at least one network, the network packets transmitted from the first and second ports, and sending, to the second port from the switch, the network packet that corresponds to the connection.

8. A method for communication by a local host having a plurality of ports that couple the host to a plurality of network channels that are coupled to a switch that distributes network packets to the ports, the method comprising:

establishing, by the local host, a transport level connection between the local host and a remote host;

receiving, from the switch via a first of the ports, a network packet that corresponds to the connection; and associating the connection with the first port, based upon receiving the network packet via the first port, including transmitting all network packets that correspond to the connection via the first port while the connection is associated with the first port.

9. The method of claim 8, further comprising:

transferring the connection from the first port to the second port, including transmitting all network packets that correspond to the connection via the second port while the connection is associated with the second port.

10. The method of claim 9, wherein transferring the connection from the first port to the second port includes:

transferring the connection from the first port to the host; and transferring the connection from the host to the second port.

11. The method of claim 9, further comprising:

receiving, via a second of the ports, a second network packet that is associated with the connection, prior to transferring the connection from the first port to the second port.

12. The method of claim 9, wherein the local host has first and second network interface cards, and transferring the connection from the first port to the second port includes transferring the connection from the first network interface card to the second network interface card.

13. The method of claim 9, further comprising:

creating a handle that identifies the connection and the port that is associated with the connection.

14. A local host having a plurality of ports that couple the local host to at least one network, the local host comprising:

a combination of information representing a transport layer connection between the local host and a remote host;

hardware to receive a network packet corresponding to the connection via a first of the ports; and a processing mechanism to associate the connection with the first port based upon receiving the network packet via the first port, wherein all network packets transmitted by the local host that correspond to the connection are transmitted via the first port while the connection is associated with the first port.

15. The local host of claim 14, further comprising:

a set of instructions running on a processor to establish the connection.

16. The local host of claim 14, wherein the processing mechanism further comprises:

a set of instructions running on a processor to transfer the connection to a second of the ports, wherein all network packets transmitted by the local host that correspond to the connection are transmitted via the second port while the connection is associated with the second port.

17. The method of claim 16, wherein the first port is part of a first network interface card, and the second port is part of a second network interface card.

18. A local host having a plurality of ports that couple the local host to at least one network, each of the local ports including hardware to send and receive network packets, the local host comprising:

a combination of information representing a transport layer connection between the local host and a remote host, the information being computer-readable and stored on a medium; and a first mechanism that monitors network traffic to determine which of the ports receives a network packet corresponding to the connection; and a second mechanism that associates the connection with the port that received the network packet, wherein all network packets transmitted by the local host that correspond to the connection are transmitted via the first port while the connection is associated with the first port.

19. A local host having a plurality of ports that couple the local host to at least one network, each of the local ports including hardware to send and receive network packets, the local host comprising:

a first set of instructions running on a processor to create a combination of information representing a transport layer connection between the local host and a remote host; and a second set of instructions running on the processor to monitor network traffic, identify which one of the ports receives a network packet corresponding to the connection and determine that the connection is associated with the one port.

20. The local host of claim 19, further comprising a mechanism to offload the connection to the one port.

* * * * *